No. 804,370. PATENTED NOV. 14, 1905.
F. R. BECKERT.
SUPPORT FOR THE SHAFTS OF INSTRUMENTS.
APPLICATION FILED APR. 5, 1904.
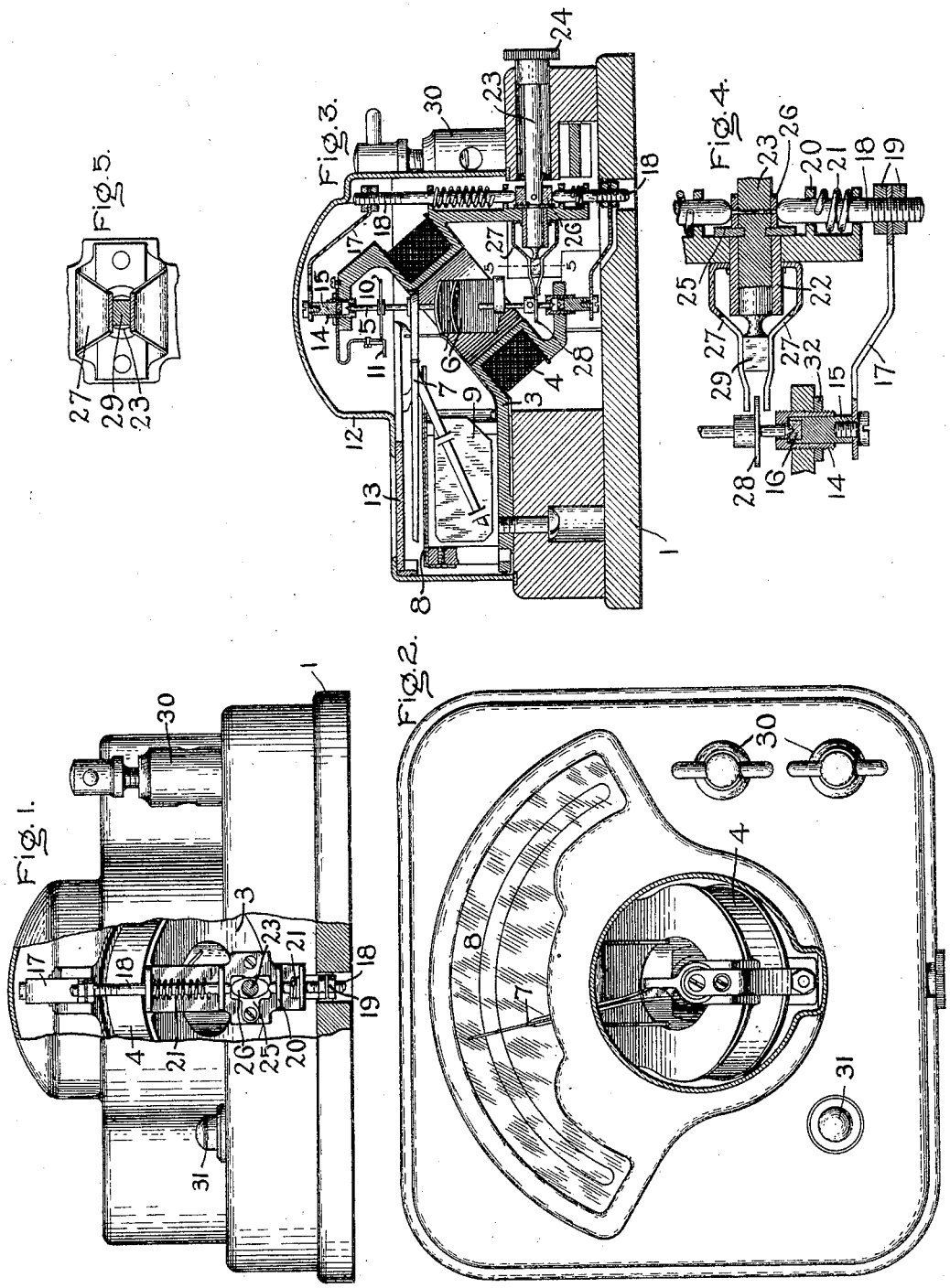
Witnesses
Inventor
Frank R. Beckert
By Atty.

UNITED STATES PATENT OFFICE.

FRANK R. BECKERT, OF LYNN, MASSACHUSETTS, ASSIGNOR TO GENERAL ELECTRIC COMPANY, A CORPORATION OF NEW YORK.

SUPPORT FOR THE SHAFTS OF INSTRUMENTS.

No. 804,370.　　　　　Specification of Letters Patent.　　　　　Patented Nov. 14, 1905.

Application filed April 5, 1904. Serial No. 201,629.

*To all whom it may concern:*

Be it known that I, FRANK R. BECKERT, a citizen of the United States, residing at Lynn, county of Essex, State of Massachusetts, have invented certain new and useful Improvements in Supports for the Shafts of Instruments, of which the following is a specification.

This invention relates to delicate instruments—such, for instance, as electric measuring instruments; and its object is to provide means for supporting the moving element of the instrument out of contact with its bearings when the instrument is not in use, and thus remove the possibility of injury to the bearings and pivots and the wear thereon while the instrument is not being used to give an indication.

In most delicate instruments having movable elements the effects of long periods of use are found principally in the bearings for the moving parts, and anything that tends to reduce this wear in the bearings lengthens the life of the instrument and improves the accuracy of its readings. Some instruments, such as electric indicating instruments, are in actual use only a very small portion of the time, so that if means are provided for supporting the moving element out of contact with its bearings when the instrument is not in use the pivots of the moving element rest in the bearings only a small fraction of the time and the wear in the bearings is minimized. I have therefore provided a device which may be quickly and readily operated from a convenient position for clamping the moving element of the instrument securely, so as to support it rigidly, and at the same time moving the delicate bearings out of engagement with the pivots of the movable element.

The novel features of my invention will be definitely indicated in the claims appended hereto.

The details of construction and the mode of operation of my improved device for minimizing the wear in the bearings of delicate instruments will be better understood by reference to the following description, taken in connection with the accompanying drawings, which show the preferred embodiment of my invention.

In the drawings I have illustrated my invention as applied to an electric indicating instrument of the well-known inclined-coil type; but it must be understood that my improvements are applicable generally to delicate instruments of all kinds.

Figure 1 of the drawings is a back view of such an instrument broken away in part. Fig. 2 is a top view. Fig. 3 is a section. Fig. 4 is a detail view of some of the parts, and Fig. 5 is a section along the line 5 5 of Fig. 3.

In the drawings, 1 represents a base of wood or other suitable material, to which is secured by screws 2 a frame 3, carrying the coil 4 of the instrument and the supports for the bearings in which the shaft 5 is pivoted. Shaft 5 carries one or more small plates 6 6 of magnetizable material mounted obliquely thereon, and the support for the coil 4 holds it in an inclined position relatively to the shaft, as shown. Mounted on the shaft 5 is an indicator 7, which moves over a scale 8, mounted on the frame 3, and a light plate 9 is secured to the indicator 7 in any suitable manner, so as to move back and forth therewith and dampen its oscillations. A light spring 10 has one end attached to shaft 5 and the other to a bracket 11, secured on top of frame 3, and serves to return the indicator to the zero position. A suitable casing 12 incloses the parts of the instrument and is provided with a glass plate 13, through which the positions of the indicator with reference to the scale are read. Mounted on the casing are two binding-posts 30, to which the circuit-wires are brought, and a push-button switch 31 for completing the electrical connections through the instrument. A more detailed description of these parts is not considered necessary, as they are well understood by those skilled in the art and form no part of my invention.

Mounted in threaded openings in arms formed integral with the frame 3 are hollow screws or receivers 14 14 for the jewel-supports 15 15, locked in position by the locknuts 32. The supports 15 carry jewels 16 in their adjacent ends and are adapted to slide axially of the shaft 5 in the openings in the receivers 14. Jewel-supports 15 are each attached by screws, as shown, to springs 17 17, of phosphor-bronze or other suitable material, which are adjustably mounted on the lifting-rods 18 18, nuts 19 19 being provided on the threaded ends of the rods to lock the springs 17 in any position to which they are adjusted, and these rods are adapted to move in a line parallel with shaft 5 in openings in lugs 20 20, formed integral with the frame 3. Springs 21 21 are coiled about the lifting-rods 18, and each has one end secured in an opening in the rod, so that the springs normally tend to draw the two rods together.

In an opening in the back part of frame 3 is a bushing 22, forming a bearing for the actuating-shaft 23, which carries a thumb-nut 24 on its outer end outside of the casing of the instrument. Secured to frame 3 is a guard 25, which extends into a groove in the shaft 23 to prevent longitudinal movement thereof. Pinned to shaft 23 is an oval-shaped washer or cam 26, against the periphery of which the lifting-rods 18 are pressed by the springs 21. Secured on the inner side of the rear part of frame 3 are two clamping-springs 27, and mounted on shaft 5 by a set-screw is a disk 28, which is grasped by the clamping-springs 27 when they are released to support the moving element of the instrument. On its inner end shaft 23 carries another cam or block 29, arranged at right angles to the cam 26 and adapted to separate the clamping-springs 27 when in an upright position and when turned to a horizontal position to release them and allow them to grip the disk 28.

The position of the parts when the instrument is not in use is that shown in Fig. 3. The cam 26 being in the upright position holds the rods 18 apart against the tension of springs 21, and the jewel-supports 15, carried by the rods, are held back in the receivers 14, so that the jewels are out of engagement with the ends of shaft 5. The block 29 being at right angles to cam 26 is in the horizontal position, and therefore springs 27 are permitted to grip the disk 28, so that the moving element of the instrument is held firmly by the clamping-springs, the ends of shaft 5 being steadied in position by the receivers 14, into the ends of which the extremities of the shaft extend. When it is desired to use the instrument to give an indication, shaft 23 is given a quarter-turn in either direction by thumb-nut 24, thus bringing the parts to the position shown in Fig. 4. Block 29, carried by shaft 23, separates the clamping-springs 27, so as to release the moving element, and at the same time cam 26 is turned to the horizontal position, permitting the lifting-rods 18 to be moved toward each other by springs 19, and thus bringing the jewels 16 into supporting relation to shaft 5, in which position they are held against the ends of the shaft by the tension of the springs 17. The instrument is then ready for use in giving an indication, and the wear on the bearings, together with any injury or accident thereto resulting from rough handling of the instrument during the entire period in which it was not in use, has been avoided.

As above stated, I have illustrated and described my invention herein as applied to an electric indicating instrument of the inclined-coil type; but I do not limit myself to the use of the invention in any particular way, as it is of general application to all delicate instruments. Also many modifications may be made in the construction shown and described without departing from the spirit of my invention, and I aim to cover all such modifications in the claims appended hereto.

What I claim as new, and desire to secure by Letters Patent of the United States, is—

1. An instrument having a rotatable element, bearings therefor, and movable operating means connected with the bearings for moving them into and out of supporting relation to said rotatable element.

2. In an instrument, a vertical shaft, two bearings therefor, and means for moving the bearings simultaneously out of supporting relation to the shaft.

3. An instrument having a movable element, bearings therefor, means for moving the bearings out of supporting relation to the movable element, and means for clamping said element to support the same.

4. An instrument having a casing, a movable element pivoted for rotation, and a movable bearing therefor within the casing, and means operated from outside the casing for moving the bearing out of engagement with the pivot of said movable element.

5. An instrument having a shaft, stationary members having openings therein, bearings for the shaft movable axially thereof in said openings, and movable operating means connected with the bearings for moving them toward and away from the shaft.

6. An instrument having a shaft, stationary members having openings therein, bearings for the shaft movable axially thereof in said openings, means for moving the bearings, and means for supporting the shaft.

7. An instrument having a movable element, bearings therefor, and means for simultaneously moving the bearings out of supporting relation to said element and clamping said element to support it.

8. An instrument having a shaft, a member thereon, spring-actuated clamps mounted on a stationary part of the instrument, and means for moving the clamps against the tension of the springs or permitting movement in the opposite direction to throw them into or out of gripping relation to said member.

9. A measuring instrument for delicate forces provided with a movable element, cup-bearings therefor, means for withdrawing the cup-bearings, and means for supporting the element when the bearings are withdrawn.

10. An instrument having a shaft, a rod movable parallel to the shaft, a bearing for the shaft carried by said rod, and means for reciprocating the rod.

11. An instrument having a shaft, a rod movable parallel to the shaft, a bearing for the shaft spring-mounted on said rod, and means for reciprocating the rod.

12. An instrument having a shaft, rods movable parallel to the shaft, bearings for the shaft spring-mounted on said rods, springs for moving each rod in one direction, and means for moving each rod in an opposite direction.

13. An instrument having a shaft, stationary members having openings therein, bearings for the shaft movable in said openings, rods movable parallel to the shaft, springs carried by the rods and supporting said bearings, and means for reciprocating the rods.

14. An instrument having a shaft, rods movable parallel thereto, bearings for the shaft spring-mounted on said rods, means for reciprocating the rods, clamping members, and means whereby reciprocating said rods throws said clamping members into and out of supporting relation to the shaft.

15. In an electric meter, an armature-spindle, a lower bearing therefor, and a separate spring for holding the spindle while free from said bearing.

16. In an electric meter, an armature-spindle, a lower bearing therefor, and a separate device adapted to hold said spindle at the same height as in use, when the lower bearing is withdrawn.

In witness whereof I have hereunto set my hand this 2d day of April, 1904.

FRANK R. BECKERT.

Witnesses:
DUGALD McK. McKILLOP,
JOHN A. McMANUS.